United States Patent
Ihm et al.

(10) Patent No.: US 9,185,549 B2
(45) Date of Patent: Nov. 10, 2015

(54) METHOD FOR SENDING AND RECEIVING TERMINAL CAPABILITY CHANGE INFORMATION FOLLOWING TERMINAL CONNECTION TO AN EXTERNAL APPARATUS

(75) Inventors: Binchul Ihm, Anyang-si (KR); Jinyoung Chun, Anyang-si (KR); Jiwon Kang, Anyang-si (KR); Kitae Kim, Anyang-si (KR); Sunam Kim, Anyang-si (KR); Sungho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 147 days.

(21) Appl. No.: 13/983,309

(22) PCT Filed: Feb. 10, 2012

(86) PCT No.: PCT/KR2012/000994
§ 371 (c)(1),
(2), (4) Date: Aug. 2, 2013

(87) PCT Pub. No.: WO2012/108713
PCT Pub. Date: Aug. 16, 2012

(65) Prior Publication Data
US 2013/0308547 A1 Nov. 21, 2013

Related U.S. Application Data

(60) Provisional application No. 61/441,660, filed on Feb. 11, 2011.

(51) Int. Cl.
H04W 8/22 (2009.01)

(52) U.S. Cl.
CPC .................................... *H04W 8/22* (2013.01)

(58) Field of Classification Search
CPC ........................................................ H04W 8/22
See application file for complete search history.

(56) References Cited

U.S. PATENT DOCUMENTS

| 2009/0036183 | A1 | 2/2009 | Cho et al. |
| 2010/0173664 | A1* | 7/2010 | Han ............................. 455/522 |
| 2011/0149942 | A1* | 6/2011 | Ko et al. ....................... 370/343 |

(Continued)

FOREIGN PATENT DOCUMENTS

| JP | 2001-142837 A | 5/2001 |
| KR | 10-0617484 B | 8/2006 |
| KR | 10-2009-0012711 A | 2/2009 |

OTHER PUBLICATIONS

International Search Report issued in corresponding International Patent Application No. PCT/KR2012/000994 dated Sep. 27, 2012.

(Continued)

*Primary Examiner* — Brian D Nguyen
(74) *Attorney, Agent, or Firm* — Morgan, Lewis & Bockius LLP (57) ABSTRACT

The present invention relates to concerns a capability information transmission method in a wireless mobile communication system wherein, when a terminal having a predetermined capability reports the capability of the terminal to a base station, the reporting comprises the steps of: connecting to an external apparatus comprising at least an antenna; and reporting, to the base station, information giving the capability as changed by the connection with the external apparatus.

10 Claims, 3 Drawing Sheets

(56) References Cited

U.S. PATENT DOCUMENTS

| | | |
|---|---|---|
| 2011/0164519 A1* | 7/2011 | Nishio et al. ............. 370/252 |
| 2011/0185278 A1* | 7/2011 | Flickinger et al. ......... 715/727 |
| 2011/0287820 A1* | 11/2011 | Harrison et al. .......... 455/575.7 |
| 2012/0071203 A1* | 3/2012 | Wong .................... 455/550.1 |
| 2012/0147274 A1* | 6/2012 | Hassan et al. ............. 348/729 |

OTHER PUBLICATIONS

Written Opinion issued in corresponding International Patent Application No. PCT/KR2012/000994 dated Sep. 27, 2012.

* cited by examiner

METHOD FOR SENDING AND RECEIVING TERMINAL CAPABILITY CHANGE INFORMATION FOLLOWING TERMINAL CONNECTION TO AN EXTERNAL APPARATUS

This is a U.S. National Phase Entry of PCT Application No. PCT/KR2012/000994 filed Feb. 10, 2012, and claims the benefit of U.S. Provisional Application No. 61/441,660 filed Feb. 11, 2011.

FIELD OF THE INVENTION

The present invention relates to an external device being connected to a user equipment and a method of operating the same.

BACKGROUND ART

As the semi-conductor technology and the wireless communication technology are gradually developing, in addition to the basic telephone function, user equipments are equipped with diverse additional functions, such as camera, MP3, internet, gaming functions, and so on, and, accordingly, the usage of mobile terminals have become more active and extensive.

Considering the portability for the user, the size of the user equipment, which corresponds to one of the elements of the communication system (CDMA, GSM, HSPA, LTE, WiMAX, WLAN, and so on), generally ranges from the size of a cellular phone to the size of a notebook or tablet pc. Due to such limitation in size, transmitting/receiving antennae and the related RF (Radio Frequency) circuit act as the crucial criteria that are to be considered when designing the device. And, it may be expected that user equipments that are to be commercialized for the next few years can be equipped with generally 2 antennae and up to 4 antennae. Such installation state may directly influence the capability of the user equipment by determining the maximum number of layers or streams for SM (spatial multiplexing).

Among the capabilities of the user equipment, a function of enhancing the capability level by simply performing software (S/W) upgrade may be included. However, the capability of the above-described example cannot be enhanced unless the hardware (H/W) is replaced. Therefore, depending upon the situation of the user equipment, the communication quality may not exceed the quality level decided by the hardware or may be degraded to a much lower level.

Figure 1:
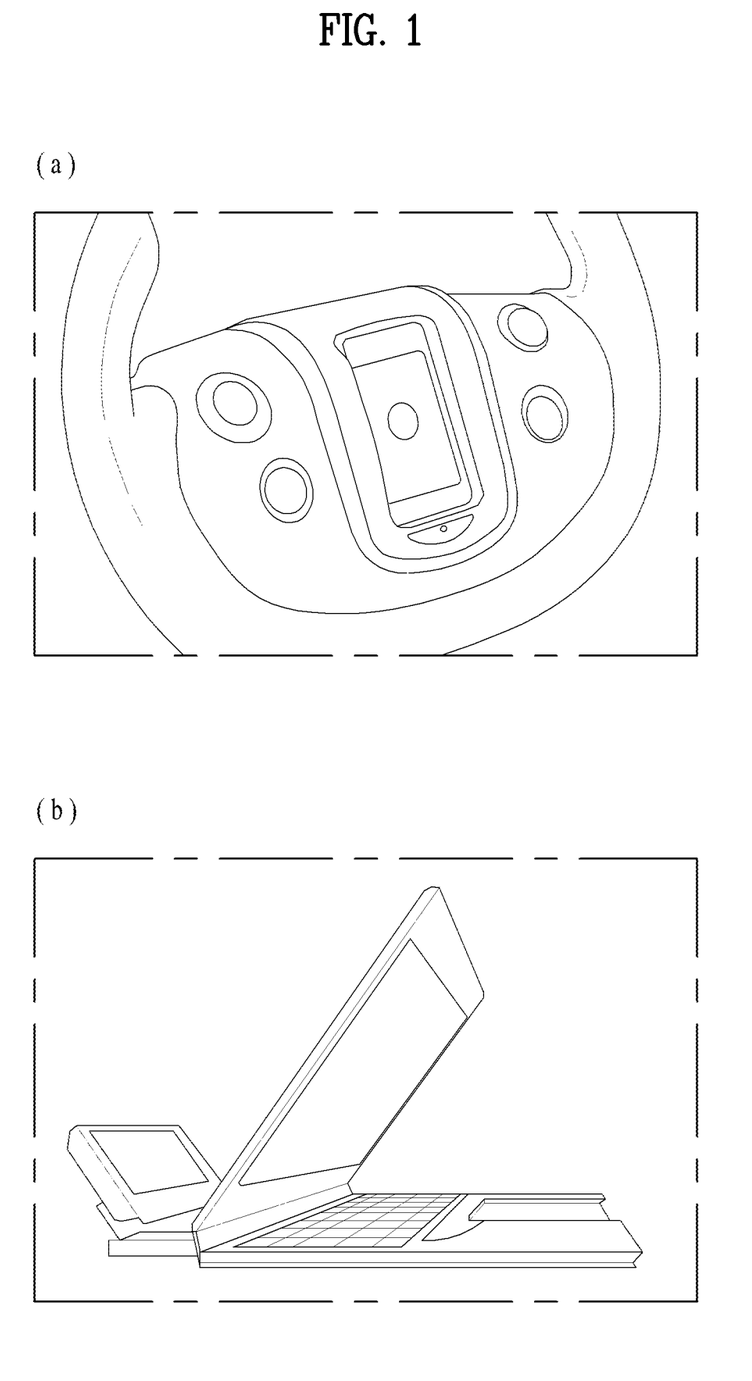
FIG. 1a illustrates a related art example of mounting a smart phone in a car.
FIG. 1b illustrates a related art example of mounting a smart phone in a related art device referred to as a lapdock.

FIG. 1a illustrates a related art example of mounting a smart phone in a car.

This may be more apparent considering the tendencies of the market of seeking to provide Car Infotainment (information entertainment) services by coupling a most recent user equipment with an automotive vehicle. For example, when the user seeks to mount the smart phone he (or she) was carrying on his (or her) car in order to perform functions, such as navigation, tethering, blackbox, telematics functions, and so on, due to the mounting of the smart phone inside the vehicle (or car), the communication environment may become degraded. More specifically, since the smart phone enters the inside of a car, which consists of an environment that effectively blocks and shields electromagnetic waves, the link quality between the smart phone and the network becomes poor, and, accordingly, the communication quality is also degraded.

FIG. 1b illustrates a related art example of mounting a smart phone in a related art device referred to as a lapdock.

In some cases, a smart phone may be docked and used with a device, which is referred to as a lapdock. However, in this case, a display of the lapdock may block the smart phone, thereby causing a disturbance in the transmission/reception of the electric waves (or radio waves). Furthermore, as another example, the smart phone may be paired with a tablet, so as to be used as a device set.

As described above, in an attempt of connecting a communication user equipment with an external device for diverse usage, a structure and operation method for enhancing the communication quality of the user equipment, instead of degrading the communication quality, is required.

DETAILED DESCRIPTION OF THE INVENTION

Technical Objects

An object of the present invention is to provide an optimized method for efficiently transmitting and receiving data, by using a module included in an external device, when a portable (or mobile) user equipment is paired with the external device, and by providing the module to the portable user equipment, so as to change the module of the user equipment.

Technical Solutions

In order to achieve the technical object of the present invention, provided herein is a method of for transmitting a capability information to a base station in a wireless mobile communication system includes the steps of connecting to an external device including at least an RF (Radio Frequency) circuit; and reporting information on a capability changed by being connected to the external device to a base station.

In order to achieve the technical object of the present invention, provided herein is a method of receiving capability information from a user equipment at a base station in a wireless mobile communication system includes the steps of allowing a user equipment to enter a network of the base station, the user equipment having a predetermined capability; receiving information on the capability of the user equipment from the user equipment; and receiving information on the changed capability of the user equipment from the user equipment.

In order to achieve the technical object of the present invention, provided herein is provided herein is a user equipment for reporting the capability to a base station, in a wireless communication system, includes an RF module configured to transmit and receive a radio signal; and a processor configured to be connected to the RF module so as to control the RF module, wherein the processor connects the user equipment to an external device including at least an antenna, and controls the RF module so as to report information on a changed capability, the capability being changed by connecting to the external device to the base station.

In order to achieve the technical object of the present invention, provided herein is a base station for receiving capability information from a user equipment in a wireless system includes an RF module configured to transmit and receive a radio signal; and a processor configured to be connected to the RF module so as to control the RF module, wherein the processor allows the user equipment to enter a network of the base station, controls the RF module so as to receive information on the capability of the user equipment and controls the RF module so as to receive information on the changed capability of the user equipment from the user equipment.

In order to achieve the technical object of the present invention, provided herein is a capability information transmitting method according to the present invention including information on a number of antennae changed by the antenna of the external device.

In order to achieve the technical object of the present invention, provided herein is a capability information transmitting method according to the present invention further including a power amplifier, wherein information on the changed capability includes a maximum transmission power level determined by the power amplifier.

Effects of the Invention

According to the exemplary embodiments of the present invention, by optimizing the usage environment of the portable user equipment and the external device, when pairing the portable user equipment with the external device, a more improved communication environment may be realized, thereby enabling the communication quality of the user equipment to be enhanced.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

A more detailed understanding of the present invention may be gained from the following detailed description of the present invention, which will be made based upon examples with reference to the accompanying drawings.

MODE FOR CARRYING OUT THE PRESENT INVENTION

Additional advantages, objects, and features of the present application will be set forth in part in the description which follows and in part will become apparent to those having ordinary skill in the art upon examination of the following or may be learned from practice of the present application.

The technology described below may be used in a wide range of wireless access schemes, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE (Institute of Electrical and Electronics Engineers) 802.11 (Wi-Fi), IEEE 802.16 (WiMAX), IEEE 802.20, E-UTRA (Evolved UTRA), and so on. The UTRA corresponds to a portion of the UMTS (Universal Mobile Telecommunications System). And, as part of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

In the description of the present invention, with the exception for the LTE network, a WCDMA network or a CDMA network, and so on, will hereinafter be given as an example and will be expressed as a legacy network. Additionally, in the following description of the present invention, it will be assumed that a user equipment (or terminal) or device will be used to collectively refer to any mobile or fixed user-end device (or equipment), such as UE (User Equipment), MS (Mobile Station), and so on. Furthermore, it will also be assumed that the base station will be used to collectively refer to any random (or arbitrary) node, such as Node B, eNode B, Base Station, and so on, of a network end, which communicates with the user equipment or device.

Additional advantages, objects, and features of the present application will be set forth in part in the description which follows and in part will become apparent to those having ordinary skill in the art upon examination of the following or may be learned from practice of the present application. The objectives and other advantages of the present application may be realized and attained by the structure particularly pointed out in the written description and claims hereof as well as the appended drawings.

Hereinafter, reference on the preferred embodiments of the present invention will now be described in detail, and the examples of the present invention will be described with reference to the appended drawings. Whenever possible, in order to indicate the same or similar parts, the same reference numbers will be used throughout the drawings.

When using the user equipment by mounting (or docking) or connecting the user equipment to another device, such as a car or a lap dock, in order to prevent the communication quality of the user equipment from being degraded, a method of relocating the transmitting/receiving antennae of the user equipment to a different location having a better radio wave quality may be used. However, it is generally impossible to relocate the antenna of the user equipment, and, even if the relocation of the user equipment antenna is possible, the relocation procedure may become extremely inconvenient.

The present invention proposes a structure and operation method for increasing or replacing the antenna of the communication terminal (e.g., Mobile Station, User Equipment, and so on) by using the antenna of another equipment.

Meanwhile, even if the user equipment is provided with a more improved capability after being connected to the external device, if the network is unaware (or uninformed) of the change in the user equipment capability, the user equipment eventually communication with the user equipment based upon the initial capability instead of the changed capability. Therefore, in order to apply the change in the user equipment capability with respect to the connection between the user equipment and the external device to a communication between the user equipment and the network, which will be carried out later on, and, in case the user equipment is connected to the external device, which is equipped with at least one antenna and/or related RF circuit, the present invention proposes a method and apparatus for reporting a changed capability of the user equipment to the network. Accordingly, in addition to contributing to the enhanced communication efficiency between the user equipment and the external device, which is connected with the user equipment, the enhanced capability of the user equipment may also be used by the network, so as to optimize the network usage environment, which exceeds firmware upgrade. More specifically, the present invention is advantageous in that, by reporting the Capability of the user equipment, which is changed by the connection between the user equipment and the external device, to the base station, the usage environment of the user equipment and the external device can be optimized.

According to the present invention, in case the external device is connected to the user equipment, since the antenna of the external device can be used in combination with the antenna of the user equipment, an effect of increasing the number of antenna of the user equipment may be gained. Alternatively, instead of using the antenna of the user equipment, only the antennae of the external device may be used to perform communication. For example, in case a user equipment, which is equipped with 2 antennae, is mounted on a car, which is equipped with 4 antennae, the user equipment may shift to a state of being equipped with 6 antennae or may shift to a state of being equipped with 4 antennae. According to the present invention, the user equipment, which may be connected to another device, should be equipped with the functions respective to the number of its own antennae, and should also, at the same time, be equipped with the functions respective to a situation of using a larger number of antennae. In the above-described example, since the number of antennae included in the user equipment itself is equal to 2, the user equipment may receive a maximum of 2 streams via downlink, and, therefore, the user equipment should be equipped with a function supporting such reception. And, additionally, if the user equipment also uses the 4 antennae equipped to the car, 4 streams may further be received, and, therefore, the user equipment should also be equipped with a function supporting such additional reception. For example, in the above-described example, it will be preferable that the user equipment is equipped with the functions of both a 2×2 MMSE (minimum mean-square error) and a 4×4 MMSE receiver.

Figure 2:
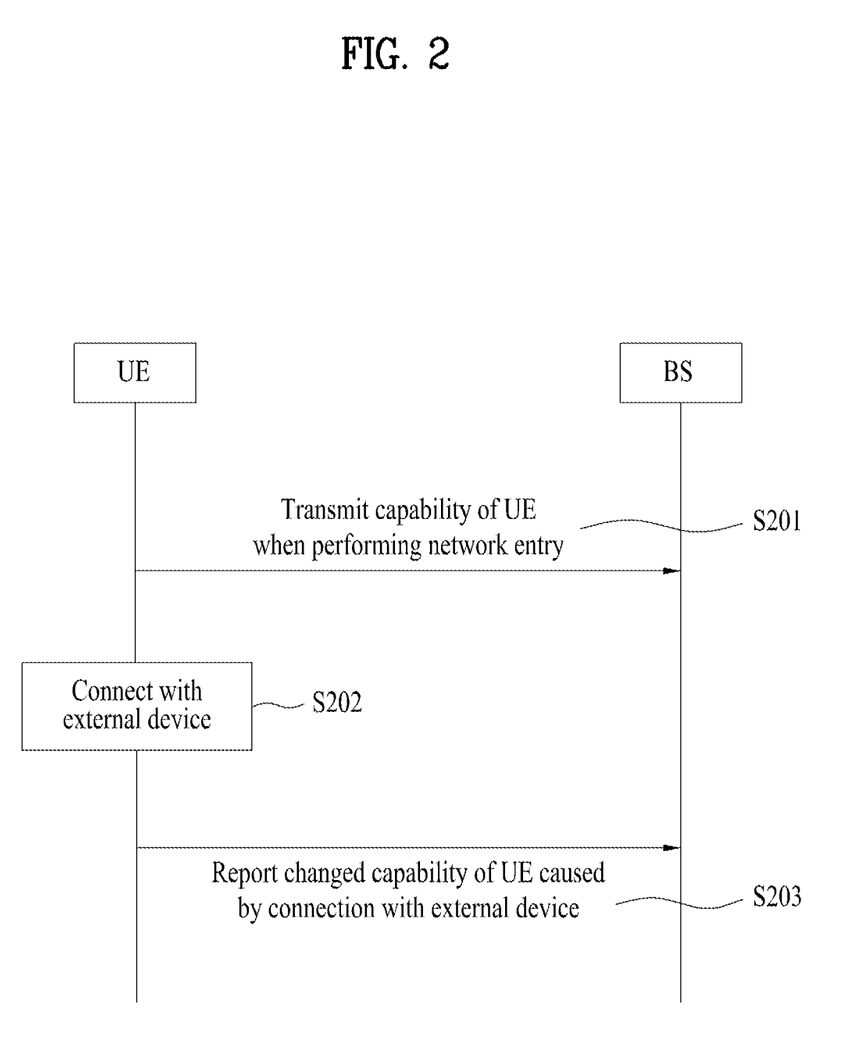
FIG. 2 illustrates a procedure for transmitting information on the user equipment and information on the changed capability of the user equipment according to an exemplary embodiment of the present invention.

FIG. 2 illustrates a procedure for transmitting information on the changed capability of the user equipment at a user equipment according to an exemplary embodiment of the present invention. During a negotiation procedure of performing the initial network entry, the user equipment reports the capability of the user equipment to the network (S201). Therefore, the network recognizes the maximum number of downlink streams that can be supported by the user equipment. In case of performing handover of the user equipment, or in case of performing network re-entry, the network performs a negotiation procedure with the user equipment once again including the capability information of the user equipment.

The user equipment transmits a ranging request message to the base station and performs an initial ranging procedure as a response to the transmitted message, and, during this procedure, automatic adjustments respective to parameters, such as power level, offset, frequency, and so on, are performed. Once the initial ranging is completed, the user equipment notifies its basic capability to the base station, and, then, the base station responds to the received notification, so as to inform one another of the common capability between the user equipment and the base station, thereby performing the basic capability negotiation procedure. The user equipment transmits a registration request message to the base station, and, as a response, the base station transmits a registration response message to the user equipment. By having the user equipment and the base station set up an IP (Internet Protocol) access and transmit operation parameters, the network entry procedure of the user equipment is completed.

The capability information, which is reported during the negotiation procedure of performing the initial network entry, may include at least one of a connection identifier (CID), a service data unit MTU capability (SDU MTU Capability) field, a Physical Parameters Supported field, a Bandwidth Allocation Support field, Security Negotiation Parameters, a Maximum number of supported security association field, an NSP list and MIH capability support field, and information on the antenna capability.

Up until now, the user equipment has reported its capability, which is decided by hardware elements and software elements being equipped in the user equipment itself, to the network. Conversely, according to the present invention, the user equipment is connected to the external device (S202), and, in case the user equipment additionally uses the antennae equipped in the external device or replaces its antennae with the antennae equipped in the external device, the user equipment reports the capability respective to the changed number of antennae to the network. For example, the user equipment may determine the change in the number of antennae, due to an impedance change or plug in caused by the connection with the external device.

According to the present invention, in addition to the hardware of the user equipment itself, by using the hardware of the external device, which is being connected with the user equipment, the capability of the user equipment may be changed, thereby providing optimized capability. By being connected with the external device, an effect excelling the function of level enhancement by simply upgrading the software (S/W) may be gained. More specifically, by using an antenna module of the external device, the radio wave quality within the user equipment may be enhanced. An antenna may be installed in the external device, and an RF (Radio Frequency) signal may be transmitted and received to and from the user equipment. Thus, after installing the antenna in the external device, a more improved communication environment may be configured, thereby enhancing the communication quality of the user equipment.

In order to allow the user equipment to sufficiently use the structure as proposed above, a procedure for reporting the information on the changed antenna capability to the network is performed. The user equipment reports the changed number of antennae, and so on, to the network, so as to be capable of supporting a larger amount of data streams. In order to do so, the user equipment determines the number of antennae of the external device and performs switching from the internal RF module of the user equipment to the external RF module of the external device. More specifically, configurations may be made so that the operation can be performed by using the RF module of the external device. As described above, the user equipment may turn off the internal RF module and may switch on the RF module of the external device (external RF module), thereby reporting the changed information. Accordingly, the signal processing flow may bypass the internal RF module of the user equipment, so that the signal can be processed in the external RF module of the external device. Alternatively, setting may be made so that both the internal RF module of the user equipment and the RF module of the external device can be turned on, thereby allowing both the internal RF module of the user equipment and the RF module of the external device to be used.

The external device that is being connected to the user equipment may include at least one antenna and may additionally include a power amplifier or an oscillator.

By further installing a power amplifier in the external device, boosting/deboosting of the RF signal transmitted from the user equipment may be performed. Most particularly, the external device, such as a car or a lapdock, which is connected to the user equipment, may have surplus power as compared to the user equipment or may have a more powerful power amplifier, the quality of the downlink may be outstandingly enhanced.

Alternatively, in case the external device being connected to the user equipment includes an oscillator, instead of using the oscillator of the user equipment itself, by using the oscillator of the external device, the baseband signal may be upconverted to the RF signal and then transmitted, or the signal being received from the network may be downconverted so as to generate a baseband signal. Meanwhile, in case the external device is equipped with multiple oscillators, instead of performing communication using a single carrier by using multiple oscillators, the user equipment may perform communication by using multiple carriers through carrier aggregation. This is the same as dividing the user equipment into a BBU (baseband unit) and an RRU (remote radio unit). In another words, since the BBU (baseband unit) performs processor operations of the user equipment, and since the RRU (remote radio unit) performs the role of transmitting signals, the user equipment is divided and used accordingly. According to the present invention, since a more enhanced communication environment can be realized due to such external device, the communication quality of the user equipment may be enhanced.

Additionally, the user equipment being connected to the external device, which further includes a power amplifier installed therein, may determine the capacity of the power amplifier, so as to update the maximum transmission power value, which is used for the uplink power control. More specifically, by performing a replacement, so that the power amplifier of the external device can be used rather than the power amplifier of the user equipment, data transmission/reception may be realized in a more stable environment. The user equipment may perform capability reporting, which indicates the transmission power caused by the changed power amplifier.

Figure 3:
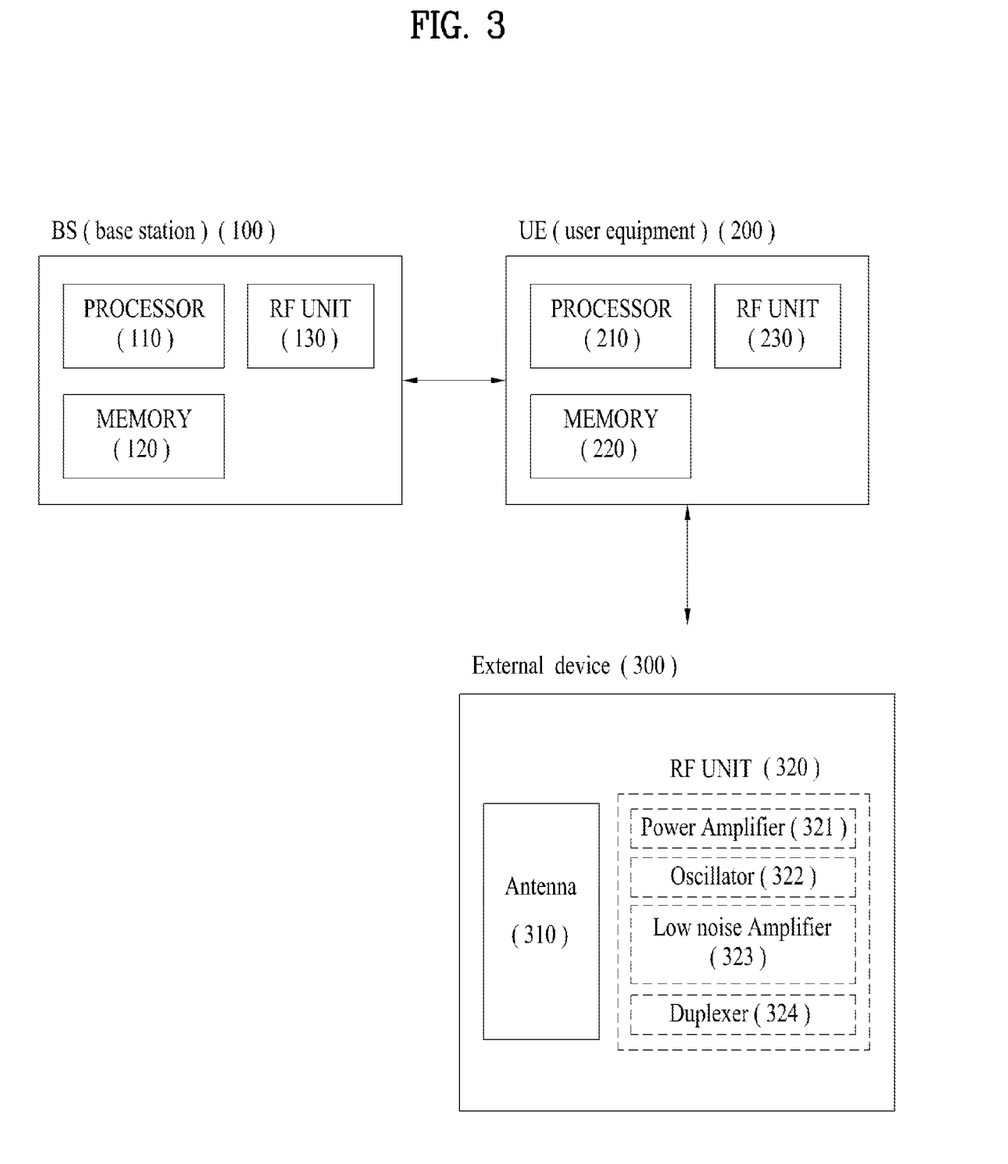
FIG. 3 illustrates a block view showing the base station, the user equipment, and the external device.

FIG. 3 illustrates a block view showing the base station, the user equipment, and the external device.

Referring to FIG. 3, the base station (100) includes a processor (110), a memory (120), and an RF module (or unit) (radio frequency module (or unit)) (130). The processor (110) realizes the functions, procedures, and/or method that are proposed in accordance with the exemplary embodiment of the present invention. For example, the processor (110) may control the RF module, so that information on changed settings and/or capability of the user equipment respective to the connection with the external device (300) can be received from the user equipment (200). The memory (120) is connected to the processor (110) and stores diverse information for operating the processor (110). The RF module (130) is connected to the processor (110) and transmits and/or receives a radio signal, based upon the control of the processor (110). The RF module (130) may consist of a plurality of nodes being connected to the base station (100) via wired connection.

The user equipment (200) includes a processor (210), a memory (220), and an RF module (230). The processor (210) may recognize the connection with the external device (300). The processor (210) may be capable of determining the connection between the user equipment and the external device through an impedance change or a plug in. The processor (210) may change the configuration of the user equipment (200) by applying the structure of the external device. For example, in case the user equipment (200) adds an antenna of the external device to the antenna of the user equipment and uses the corresponding antenna, the processor (210) may reconfigure the antenna configuration of the user equipment (200), so that the antenna configuration can include the changed number of antennae. In case of using the power amplifier and/or oscillator of the external device, the processor (210) may change the configuration of the user equipment, so that the user equipment (200) can include the power amplifier and/or oscillator.

The processor (210) controls the number of antennae respective to the RF module (330) of the external device, when the user equipment is being connected with the external device (300) and controls the RF module (230) of the user equipment and also transmits the information on the changed number of antennae to the base station. Additionally, the processor (210) may transmit a maximum transmission power level, which is changed in accordance with the capacity of the power amplifier included in the external device due to the connection of the external device. The processor (210) may use the changed maximum transmission power value for performing power control of an uplink channel. The processor (210) may control the RF module (230), so as to receive multiple streams respective to the changed number of antennae from the base station.

After receiving the information on the changed capability, the processor (110) of the base station (100) performs uplink/downlink scheduling, transmission power control, and so on respective to the user equipment (200) based upon the changed capability information instead of the conventional capability of the user equipment.

The memory (220) is connected to the processor (210) and stores diverse information for operating the processor (210). The RF module (230) is connected to the processor (210), so as to transmit and/or receive radio signals.

The processor (110, 210) may include an ASIC (application-specific integrated circuit), another chip set, a logical circuit, a data processing device and/or a converter converting baseband signals to and from radio signals. The memory (120, 220) may include a ROM (read-only memory), a RAM (random access memory), a flash memory, a memory card, a storage medium and/or another storage device. The RF module (130, 230) may include at least one or more antennae transmitting and/or receiving radio signals. When the exemplary embodiment of the present invention is embodied as software, the above-described method may be realized by using a module (procedure, function, and so on) performing the above-described functions. The module may be stored in the memory (120, 220) and may be performed by the processor (110, 210). The memory (120, 220) may be located either inside or outside of the processor (110, 210), and the memory (120, 220) may be connected to the processor (110, 210) by using a variety of well-known means.

The External Device (300) may include an Antenna (310) and an RF module (320). The RF module (320) may include at least any one of a Power Amplifier (321), an Oscillator (322), a Low noise Amplifier (323), and a Duplexer (324).

The external device (300) is connected to the user equipment (200), so as to control the RF module (320), thereby being capable of transmitting antenna setting (or set-up) information of the external device. Accordingly, the antenna of the user equipment may be replaced with the antenna (310) respective to the RF module (320) of the external device (300)

and used, or the corresponding antenna may be additionally included and used. More specifically, by performing a switch procedure, the antenna (external antenna) of the external device and a few or all of the antennae (internal antennae) of the user equipment may be used. Therefore, by using multiple antennae in the external device, multiple streams may be received from the base station. And, therefore, by using the changed capability information of the user equipment, which is reported by the user equipment, the base station may be capable of performing a faster and more efficient stream transmission.

Furthermore, the external device (30) may additionally perform an RF module (320) including any one of the Power Amplifier (321), the Oscillator (322), the Low noise Amplifier (323), and the Duplexer (324). In case the external device (300) includes the Power Amplifier (321) or the Oscillator (322), the user equipment (200) may use the power amplifier or oscillator of the external device.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

INDUSTRIAL APPLICABILITY

As above-described above, the method for transmitting and receiving information on the changed terminal capability with respect to the connection between the user equipment and the external device and the apparatus therefor may be applied to diverse wireless communication systems.

What is claimed is:

1. A method for transmitting capability information to a base station at a user equipment in a wireless mobile communication system, the method comprising:
   connecting to an external device including at least an antenna; and
   reporting information on a capability changed by being connected to the external device to a base station,
   wherein the external device further includes a power amplifier, and
   wherein the information on the changed capability includes a maximum transmission power level determined by the power amplifier of the external device.

2. The method according to claim 1, wherein the information on the changed capability includes information on a number of antennas changed by the antenna of the external device.

3. The method according to claim 1, wherein the external device further includes an oscillator.

4. The method according to claim 3, wherein:
   the external device includes a plurality of oscillators; and
   the user equipment transmits a signal to a network of the base station using a plurality of component carriers through carrier aggregation.

5. A method for receiving capability information from a user equipment at a base station in a wireless mobile communication system, the method comprising:
   allowing a user equipment connected to an external device including at least an antenna to enter a network of the base station, the user equipment having a predetermined capability;
   receiving information on a capability of the user equipment from the user equipment; and
   receiving information on a changed capability of the user equipment from the user equipment,
   wherein the external device further includes a power amplifier, and
   wherein the information on the changed capability includes a maximum transmission power level determined by the power amplifier of the external device.

6. A user equipment for reporting capability to a base station, in a wireless communication system, the user equipment comprising:
   a radio frequency (RF) unit configured to transmit and receive a radio signal; and
   a processor configured to:
      be connected to the RF unit to control the RF unit;
      connect the user equipment to an external device including at least an antenna; and
      control the RF unit to report information on a capability changed by being connected to the external device to the base station,
   wherein the external device further includes a power amplifier, and
   wherein the information on the changed capability includes a maximum transmission power level determined by the power amplifier of the external device.

7. The method according to claim 6, wherein the information on the changed capability includes information on a number of antennas changed by the antenna of the external device.

8. The method according to claim 6, wherein the external device further includes an oscillator.

9. The method according to claim 8, wherein:
the external device includes a plurality of oscillators; and
the user equipment transmits a signal to a network of the base station using a plurality of component carriers through carrier aggregation.

10. A base station for receiving capability information from a user equipment in a wireless system, the base station comprising:
a radio frequency (RF) unit configured to transmit and receive a radio signal; and
a processor configured to:
be connected to the RF unit to control the RF unit;
allow the user equipment to enter a network of the base station;
control the RF unit to receive information on the capability of the user equipment; and
control the RF unit to receive information on a changed capability of the user equipment from the user equipment,
wherein the external device further includes a power amplifier, and
wherein the information on the changed capability includes a maximum transmission power level determined by the power amplifier of the external device.

* * * * *